(12) United States Patent
Mann et al.

(10) Patent No.: US 8,162,347 B2
(45) Date of Patent: Apr. 24, 2012

(54) ADJUSTABLE HEIGHT FIFTH WHEEL HITCH

(75) Inventors: Steven William Mann, Gardendale, AL (US); Gavin Charles Trinoskey, Birmingham, AL (US)

(73) Assignee: Fontaine Fifth Wheel Co., Trussville, AL (US)

( * ) Notice: Subject to any disclaimer, the term of this patent is extended or adjusted under 35 U.S.C. 154(b) by 359 days.

(21) Appl. No.: 12/628,495

(22) Filed: Dec. 1, 2009

(65) Prior Publication Data

US 2011/0127751 A1 Jun. 2, 2011

(51) Int. Cl.
B60D 1/48 (2006.01)
B62D 53/08 (2006.01)

(52) U.S. Cl. ............................ 280/441.1; 280/438.1
(58) Field of Classification Search ............... 280/441.1, 280/438.1
See application file for complete search history.

(56) References Cited

U.S. PATENT DOCUMENTS

| | | | |
|---|---|---|---|
| 2,928,684 A | 3/1960 | Geiger | |
| 3,066,956 A | 12/1962 | Colorigh | |
| 3,117,804 A | 1/1964 | Bistrom | |
| 3,139,289 A | 6/1964 | Richler | |
| 3,253,840 A | 5/1966 | Granning | |
| 3,287,038 A | 11/1966 | Candlin, Jr., et al. | |
| 3,337,170 A | 8/1967 | Remy et al. | |
| 3,380,758 A | 4/1968 | Granning | |
| 3,552,774 A | 1/1971 | Gottler | |
| 3,717,273 A | 2/1973 | Berends | |
| 3,810,663 A | 5/1974 | Berends | |
| 3,826,516 A * | 7/1974 | Weber | 280/407 |
| 4,475,740 A | 10/1984 | Strick | |
| 4,671,527 A | 6/1987 | Wilson et al. | |
| 5,464,241 A | 11/1995 | Flater | |
| 5,529,329 A | 6/1996 | McCoy | |
| D395,025 S * | 6/1998 | Lindenman et al. | D12/161 |
| 5,772,229 A * | 6/1998 | Cattau | 280/438.1 |
| 5,839,745 A | 11/1998 | Cattau et al. | |
| 6,095,544 A | 8/2000 | Flater | |
| 6,247,720 B1 | 6/2001 | Linger et al. | |
| 7,448,639 B1 | 11/2008 | Mann et al. | |
| 7,735,849 B1 | 6/2010 | Mann | |
| 7,871,096 B2 * | 1/2011 | Colibert-Clarke et al. | 280/438.1 |
| 7,988,177 B2 * | 8/2011 | Colibert et al. | 280/441.1 |
| 2005/0248124 A1 | 11/2005 | Phillips et al. | |
| 2009/0127822 A1 | 5/2009 | Collibert et al. | |

FOREIGN PATENT DOCUMENTS

WO  WO 2010/132798  11/2010

\* cited by examiner

*Primary Examiner* — Kevin Hurley
(74) *Attorney, Agent, or Firm* — George P. Kobler; Lanier Ford Shaver & Payne PC

(57) ABSTRACT

An adjustable height fifth wheel hitch is provided. The fifth wheel hitch comprises a pedestal and a fifth wheel hitch assembly. The fifth wheel hitch assembly includes journal bearings which pivotally connect with risers of the pedestal. The risers of the pedestal include a plurality of openings located at different levels. The height of the fifth wheel assembly in relation to the tractor may be adjusted by aligning openings in the journal bearings with co-level openings in the risers and inserting a mounting pin through such openings.

5 Claims, 3 Drawing Sheets

ADJUSTABLE HEIGHT FIFTH WHEEL HITCH

The present invention is described with reference to the accompanying drawings. In the drawings, like reference numbers indicate identical or functionally similar elements.

DETAILED DESCRIPTION

The various embodiments of the present invention and their advantages are best understood by referring to FIGS. 1 through 5 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," "illustrated embodiment," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," "outward," "top," "bottom," or the like, and derivatives thereof are to be understood in relation to the truck or vehicle on which the fifth wheel is mounted. However, it is also to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
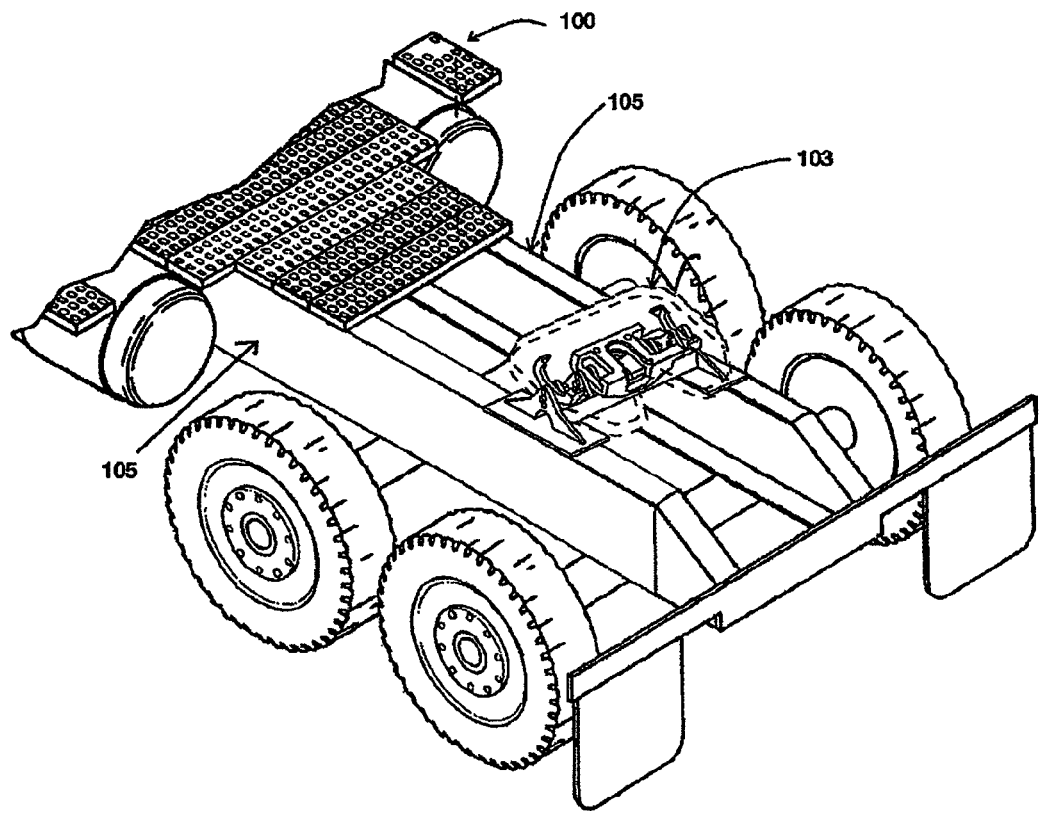
FIG. 1 is an exemplary tractor truck with an exemplary adjustable height fifth wheel hitch.
Figure 2:
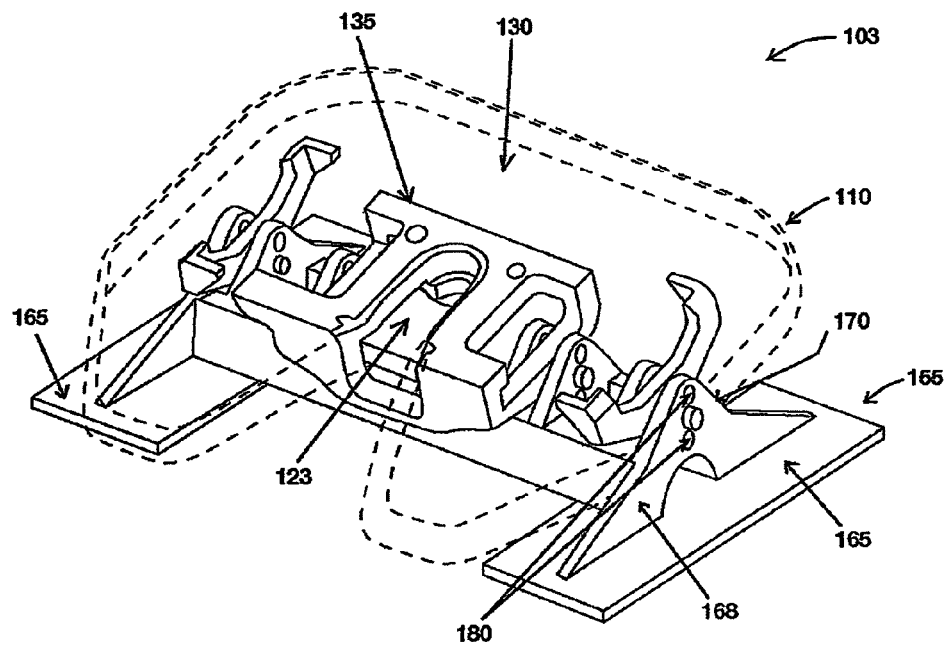
FIG. 2 is a front perspective view of the fifth wheel hitch of FIG. 1.

Fifth wheel hitches are well known in the field of towing trailers using a truck or tractor. FIG. 1 depicts an exemplary tractor and trailer hitch arrangement employing a fifth wheel hitch 103. Tractor 100 is affixed with a fifth wheel hitch 103 to rear of parallel tractor frame members 105. FIG. 2 depicts the fifth wheel hitch 103 of FIG. 1. The fifth wheel hitch 103 includes a fifth wheel hitch assembly 110 mounted on pedestal 155. Fifth wheel hitch assembly 110 comprises hitch plate 130 (shown in dashed line) which includes a locking mechanism housing 135 underneath extending from the hitch plate underside with slot 123 opening toward the aft end of fifth wheel assembly 110 for receiving a kingpin (not shown) from a trailer (not shown). Housing 135 provides a support for a locking mechanism (not shown) that retains a king pin within slot 123.

The pedestal 155 includes a two base plates 165 which attach to the top surfaces of the tractor frame members 105 (FIG. 1) and a mounting bracket 168 upon which the fifth wheel assembly 110 is attached. Mounting bracket 168 comprises an elongated transverse member spanning between the base plates 165, with ends attached to the top surfaces of the plates 165. When installed on the tractor 100, the base plates 165 may be bolted to the tractor frame members 105 or welded. As illustrated, base plates 165 are generally rectangular; however, base plates 165 may assume any number of shapes and sizes in order to fulfill the intended purpose of securing the fifth wheel hitch to the tractor. The mounting bracket 168 and the base plates 165 can be integrally formed together out of a material suitable for the forces placed upon them, or they can be attached together through any of the known attachment means in the prior art (i.e., welded, bolted, clamped, machined).

Figure 3:
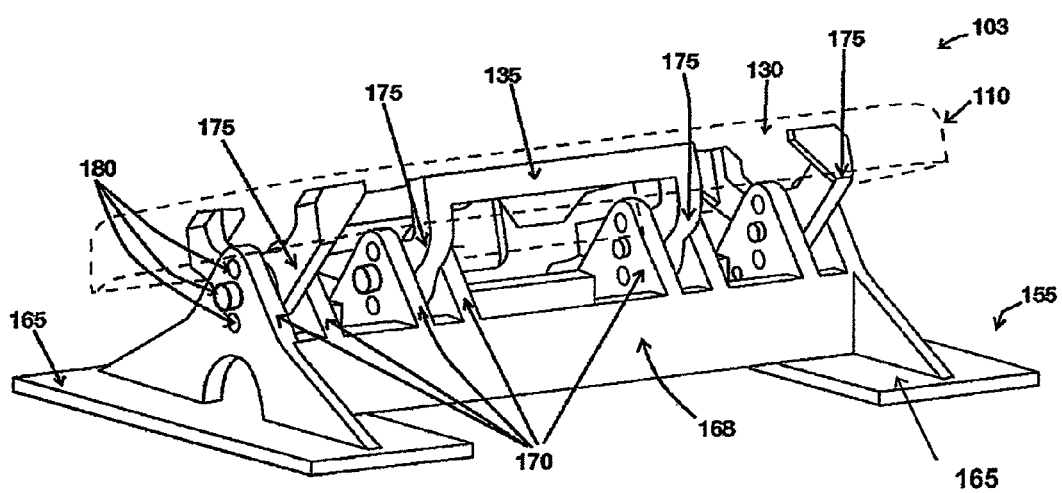
FIG. 3 is a rear perspective view of the fifth wheel hitch of FIG. 1.

Referring now to FIG. 3, the mounting bracket 168 includes a plurality of risers 170 extending upward space transversely along bracket. Risers 170 receive corresponding bearings 175 extending downwardly from the underside of the fifth wheel hitch assembly 110. The mounting bracket 168 and risers 170 can be integrally formed together out of a material suitable for the forces placed upon them, or they can be attached together through any of the known attachment means in the prior art (i.e., welded, bolted, clamped, machined).

Each of the risers 170 include an equal number of openings 180 located at different levels, corresponding to openings in the other risers lying at the same level. Such openings 180 are intended to allow pivotal connection of the plate to the pedestal via the one or more openings 181 (FIG. 4) of the journal bearings 175 of the fifth wheel hitch assembly 110. Given the vertical displacement of the openings 180, the height of the fifth wheel hitch assembly 110 may be adjusted up or down depending on the desired height of the fifth wheel hitch assembly 110 in relation to the height of the tractor frame 105 frame members 105 (FIG. 1). In the illustrated embodiment, two risers 170 of the mounting bracket 168 cradle one bearing 175 of the fifth wheel hitch assembly 110 for added support. However, in alternative embodiments, one riser 170 may connect with one bearing 175 on either the medial or lateral side, or one riser 170 may engage two bearings 175.

In the illustrated embodiment, the bearing 175 is U-shaped, with the openings 181 near the bottom of the U, and the risers 170 are generally triangular-shaped, with vertically displaced openings 180 aligned with the apex of the triangle. However, such features may be provided in other specific forms and embodiments without departing from the essential characteristics as described.

Once the desired height of the fifth wheel hitch assembly 110 is achieved, a mounting pin 190 is inserted through the selected openings 180 of the risers 170, and through the openings 181 of the bearing 175 to pivotally secure the fifth wheel hitch assembly 110 to the pedestal 155. The mounting pin 190 may be held in place through the openings 180 of the risers 170, and the openings 181 of the bearings 175 by a washer and nut (not shown), or may be held in place by a cotter pin (not shown). In the illustrated embodiment, the mounting pin 190 is in the form of a bolt with an enlarged head portion 192 to prohibit the pin from passing through the openings 180 of the risers 170. In an alternative embodiment, a mounting pin may not be necessary. Either the riser or the extension may have a flange or projection for mating with a groove or opening in the corresponding riser or bearing as the case may be.

Figure 5:
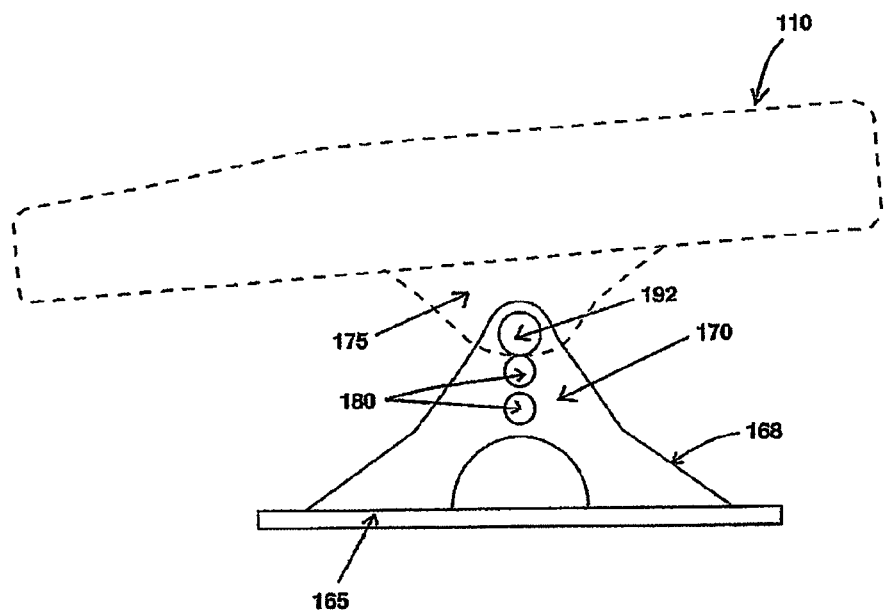
FIG. 5 is a side view of the fifth wheel hitch of FIG. 1.
Figure 4:
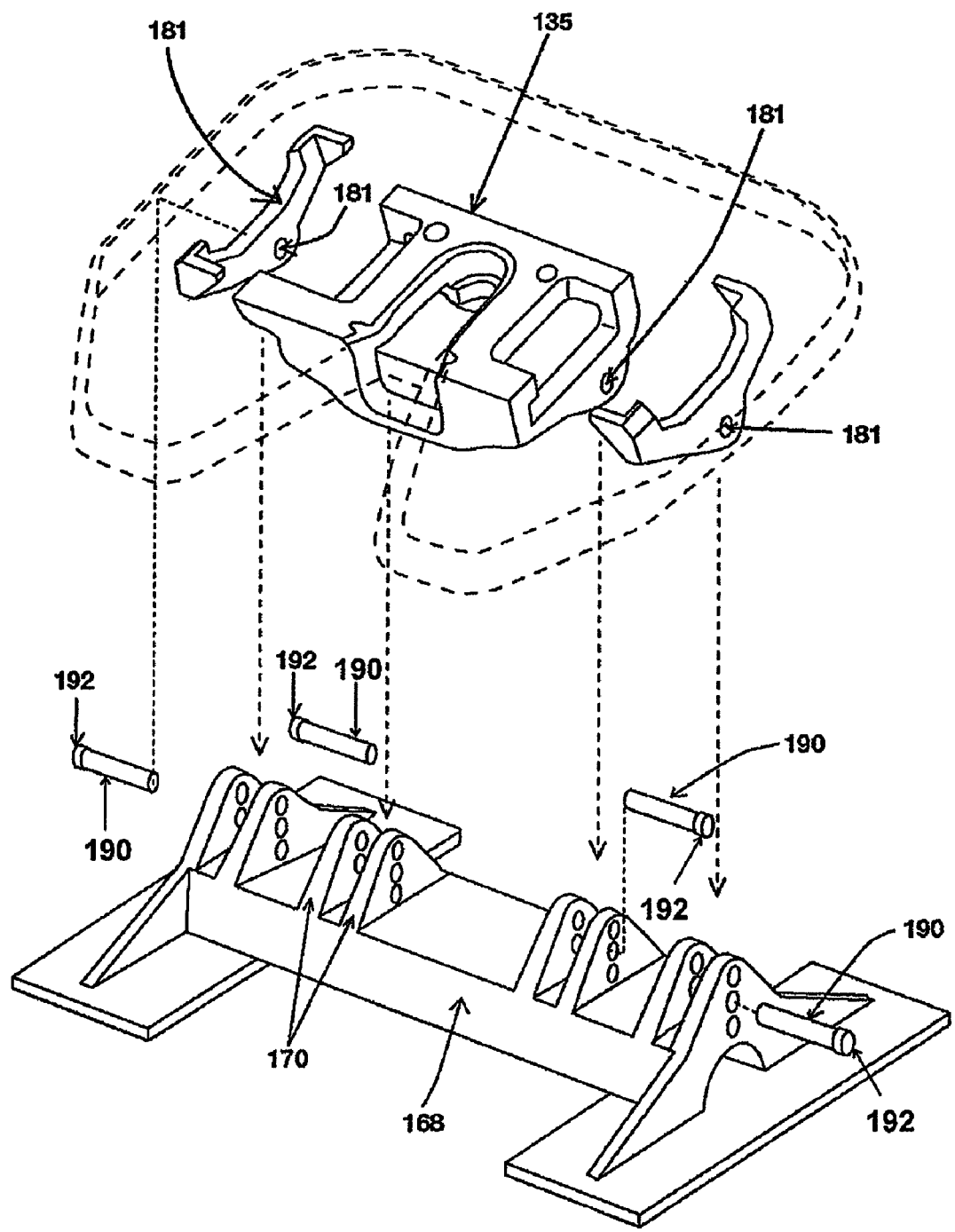
FIG. 4 is an exploded front perspective view of the fifth wheel hitch of FIG. 1.

FIG. 4 depicts the orientation of the fifth wheel hitch assembly 110 to the pedestal 155 as the risers 170 of the mounting bracket 168 mate with the extensions 175 of the fifth wheel hitch assembly 110. In the embodiment depicted in FIG. 4, there are four riser/extension pairings, calling for four mounting pins 190. It will also be appreciated that locking mechanism housing 135 may be formed to include one or more bearings, as shown in the drawings. FIG. 5 depicts a side view of the fifth wheel hitch assembly 110 of FIG. 1 with the mounting pin 190 inserted in the top most opening 180 of the riser 170 to achieve the highest displacement above the tractor frame (not shown).

As described above and shown in the associated drawings, the present invention comprises an adjustable height fifth wheel hitch. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A fifth wheel hitch comprising:
   a. a pedestal attachable to a truck frame, said pedestal comprising a plurality of transversely disposed risers extending upwardly from said pedestal, each said riser including a plurality of openings located at different levels with respect to each said riser, each said opening co-level with a corresponding opening in each other said riser;
   b. a fifth wheel hitch plate pivotally connected to said pedestal, said hitch plate comprising one or more journal bearings extending downwardly from the underside of said plate, said journal bearings comprising one or more journal bearing openings; and
   c. a removable mounting pin for pivotally connecting each said journal bearing to each said riser by inserting through said journal bearing openings and through said co-level riser openings.

2. The fifth wheel hitch of claim 1, wherein one or more journal bearings is integrally formed with a locking mechanism housing.

3. The fifth wheel hitch of claim 1, wherein said journal bearings are substantially U-shaped and said bearing openings are located near the bottom of the U.

4. The fifth wheel hitch of claim 1, wherein said plurality of risers is a plurality of riser pairs, each riser pair dimensioned to receive a journal bearing therebetween, and wherein each said mounting pin pivotally connects a journal bearing to a riser pair.

5. The fifth wheel hitch of claim 4, wherein one or more journal bearings is integrally formed with a locking mechanism housing.

* * * * *